US009065574B2

(12) United States Patent

Buch et al.

(10) Patent No.: US 9,065,574 B2

(45) Date of Patent: Jun. 23, 2015

(54) FREQUENCY TRACKING FOR A FMR TRANSMITTER

(75) Inventors: Steffen Buch, München (DE); Stefan van Waasen, Kolbermoor (DE); Tim Schoönauer, Feldkirchen (DE); Jürgen Wondra, Freising (DE)

(73) Assignee: Intel Mobile Communications GmbH, Neubiberg (DE)

( * ) Notice: Subject to any disclaimer, the term of this patent is extended or adjusted under 35 U.S.C. 154(b) by 1889 days.

(21) Appl. No.: 12/112,270

(22) Filed: Apr. 30, 2008

(65) Prior Publication Data

US 2009/0275299 A1 Nov. 5, 2009

(51) Int. Cl.

*H04B 7/00* (2006.01)
*H04H 20/22* (2008.01)
*H04H 20/34* (2008.01)

(52) U.S. Cl.

CPC ............... *H04H 20/22* (2013.01); *H04H 20/34* (2013.01); *H04H 2201/13* (2013.01)

(58) Field of Classification Search

CPC .......... H04M 1/6091; H04M 1/72522; H04M 1/7253; H04M 1/72558; H04B 1/034; H04H 2201/13; H04H 20/55; H04H 20/61; H04H 20/62

USPC ....................... 455/41.3, 41.2, 45, 345, 569.2

See application file for complete search history.

(56) References Cited

U.S. PATENT DOCUMENTS

| | | | | |
|---|---|---|---|---|
| 6,782,239 | B2 | 8/2004 | Johnson et al. | |
| 2004/0038716 | A1 * | 2/2004 | Gass | 455/569.1 |
| 2006/0223467 | A1 | 10/2006 | Mason | |
| 2008/0090515 | A1 * | 4/2008 | Wu | 455/3.06 |
| 2010/0159836 | A1 * | 6/2010 | Lau et al. | 455/42 |

* cited by examiner

*Primary Examiner* — Lewis West

(74) *Attorney, Agent, or Firm* — Eschweiler & Associates, LLC

(57) ABSTRACT

A method and device for transmitting audio data and text data to an RDS capable radio receiver by a wireless device is disclosed. The device includes a receiver for scanning a frequency range to detect an available radio frequency based on predetermined criteria. The device also includes a transmitter for transmitting data on a detected frequency that comprises RDS message data. Other systems and methods are also disclosed.

20 Claims, 7 Drawing Sheets

500

FREQUENCY TRACKING FOR A FMR TRANSMITTER

FIELD

The present invention relates generally to communication systems, and more specifically to transmitters and receivers used within these communication systems.

BACKGROUND

Several trends presently exist with regards to wireless communication devices. For example, in comparison to previous generations of wireless devices, modern wireless devices are more compact, more affordable, and have longer battery lifetimes. With the popularity of portable electronic devices and wireless devices that support audio applications, there is a growing need to provide a simple and complete solution for audio communications applications. For example, some users may utilize Bluetooth-enabled devices, such as headphones and/or speakers, to allow them to communicate audio data with their wireless handset. Other users may have portable electronic devices that may enable them to play stored audio content and/or receive audio content via broadcast communication, for example. However, integrating multiple audio communication technologies into a single device may be costly.

Combining a plurality of different communication services into a portable electronic device or a wireless device may require separate processing hardware and/or separate processing software. Moreover, coordinating the reception and/or transmission of data to and/or from the portable electronic device or a wireless device may require significant processing overhead that may impose certain operation restrictions and/or design challenges. For example, a handheld device such as a cell phone that incorporates Bluetooth and Wireless LAN may pose certain coexistence problems caused by the close proximity of the Bluetooth and WLAN transceivers.

Among the multiple audio communication technologies is the radio data system (RDS). RDS is a standard established by the European Broadcasting Union (EBU) for sending digital information via conventional FM radio broadcast signals. In the United States, the National Radio Systems Committee (NRSC) has approved the radio broadcast data system (RBDS) standard. The RDS and RDBS standards are substantially equivalent.

RDS may be utilized to communicate various types of data that may be displayed at an RDS-enabled FM receiver. For example, RDS data may include clock time information that may be utilized to synchronize a clock at the FM receiver. Program service information may include information that identifies a radio station that is currently being received at the FM receiver. Program service information may include the call letters of the radio station and/or station identity. Program type information may include information about the genre of the programming broadcast by the radio station, for example, music types such as classical, pop, or soft rock. Radio text information allows radio stations to transmit free-form textual information, such as the title and/or artist of a song currently being broadcast.

RDS may also be utilized to transmit traffic information. The traffic management channel (TMC) may be utilized to deliver traffic and travel information. Traffic and travel information may include information about alternate routes, warnings about traffic congestion, or estimates of travel times to reach destinations. RDS may also be utilized to communicate global positioning system (GPS) information to an RDS-enabled FM receiver.

FM radio (FMR) transmitters are introduced into more and more devices including mobile phones to transmit audio signals (e.g., MP3 music) to stationary or car radios in order to make use existing loudspeaker infrastructures. One general issue of the FMR transmit functionality, especially if it is used under mobile conditions like in a car, is the continuous use under changing conditions. This requires, after inequidistant and nondeterministic time intervals, a manual change of the transmit frequency and accordingly also of the receive frequency of the radio (e.g. in a car). Conventional solutions are incomplete because they mostly require manual adaptation at these intervals.

The following description and annexed drawings set forth in detail certain illustrative aspects and implementations of the invention. These are indicative of but a few of the various ways in which the principles of the invention may be employed.

DETAILED DESCRIPTION

Figure 1:
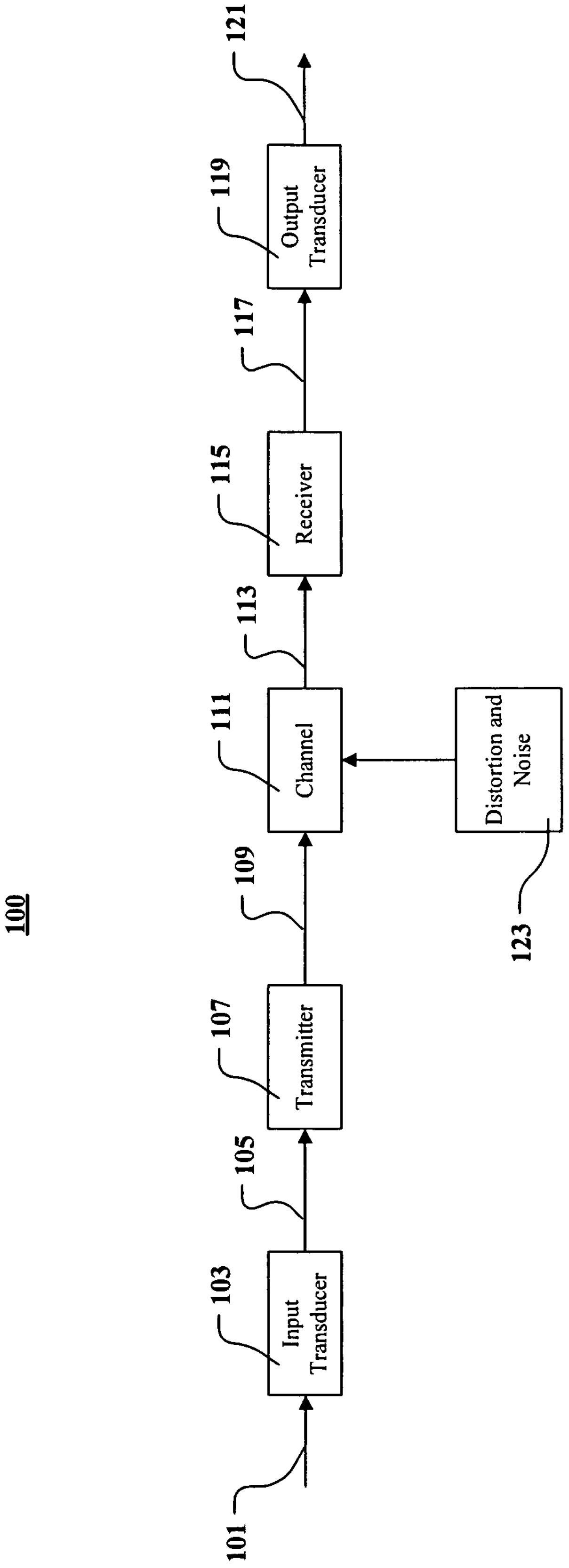
FIG. 1 is a block diagram illustrating a communication system model.

One embodiment of the present disclosure comprises an audio or wireless handheld device configured to track the frequency strength of the frequency channel it currently is transmitting audio data on. The handheld audio device transmits audio data or MP3 data to a FM Radio Data System (RDS) receiver in a car radio or other stereo. At the detection of weak signal strength on the current frequency channel, the handheld audio device will change to a newly detected frequency channel for transmission. Subsequently, the handheld audio device transmits audio data on the newly detected frequency channel and instigates a frequency channel switch at the RDS receiver. The handheld audio device operates in a similar manner as a car stereo with RDS. When a predetermined threshold level is reached in Signal-to-Noise Radio (SNR) (i.e., the original broadcast fades below a certain threshold level) the handheld audio device scans to detect an available frequency by use of the Alternative Frequency (AF) function inherent in most RDS capable radios.

The AF function of RDS automatically returns the radio tuner to the strongest signal carrying the program a user was originally listening to when the original broadcast becomes too weak to be received properly. The way the AF function operates can be summarized using an example of an RDS capable FM receiver in a car stereo system. The original RDS broadcast contains a coded list of all the alternative frequencies carrying the same information that are used for broadcasting the same program. When the original broadcast fades below a certain threshold (e.g., SNR) the RDS circuitry in the car radio will search the alternative frequencies for the strongest, most useable signal and automatically switch to it without any action required by the listener.

One embodiment of the present disclosure scans for one or more available frequencies using the same AF function of an RDS radio based on predetermined programmed criteria, such as SNR level, volume level, whether licensed broadcast are present, etc. The available detected frequencies are then stored. In an embodiment of the present invention, one of the available frequencies is selected and utilized for further transmission to the RDS capable car stereo on the selected frequency channel. In that new channel, the handheld audio device sets a Travel Announcement (TA) or Traffic Program (TP) indicator (i.e., the TP or TA flag is set to a one bit on the transmission). Just as the handheld audio device scans upon the detection of a low power signal or low SNR, the RDS stereo of the car stereo, for example, also scans upon reaching a predetermined threshold level for signal quality by use of the AF function in the car stereo RDS. When the transmitter of the handheld audio device transmits on a new frequency with the TA or TP flag, the RDS radio detects stations broadcasting with the same TA or TP flag. In order for this action to occur the TA or TP flag must be manually set on the car stereo RDS. These stations are also those meeting a predetermined signal quality.

The Traffic Program (TP) or Travel Announcement (TA) function of the RDS receiver allows detection of travel announcements broadcast by local radio stations. The handheld audio device scans when a predetermined threshold for determining signal strength by a SNR or volume level is reached. The handheld audio device scans to detect an available channel based on chosen SNR levels or power level through use of the AF function common to RDS stereos. The detected frequency channels meeting the specified SNR level and/or volume level for low interference are then stored in a memory (not shown). This scanning can be programmed to be at certain intervals, continuously in the background, or at only specified levels above or below a certain predetermined threshold. The handheld audio device then switches to a detected frequency channel stored in memory. In a similar manner, the RDS capable car stereo scans for an alternative frequency with the TP or TA flag bit set to one, and upon a low SNR level or volume level of the currently received transmission. This occurs if the TP or TA flag is set on the RDS car stereo, which must be set by the user manually. This occurs in conjunction with the AF function which stores the frequency channels broadcasting with the TP or TA flag bit on. This provides hands free driving so that the user does not have to take their hands off the steering wheel of a car, for example, to switch a station.

One embodiment of the disclosure is a method for the transmission of audio data from an audio device to a RDS capable radio receiver. The method comprises scanning an FM frequency range to track the nearest available radio frequency on which an undisturbed channel is available, and transmitting audio data on a detected frequency channel to the radio receiver as a Travel Announcement (TA) or Traffic Program (TP) and/or Enhanced Other Network (EON) to be received by the RDS capable radio receiver.

Another aspect of the present disclosure is an audio device for radio transmission of audio data configured to be received by a radio data system (RDS) capable radio receiver. The audio device comprises a receiver for scanning a frequency range to detect available radio frequencies on which no broadcast transmissions or interfering signals are currently received, and a transmitter for transmitting audio data on an available frequency channel to the RDS radio receiver as a TA or TP and/or EON to be received by an RDS capable radio.

Yet another aspect of the present disclosure is a wireless communication device, comprising a flash memory CPU. The flash memory is operatively coupled to the CPU and is configured to transfer data to and from the CPU. The device further comprises an input component for entering the data, a display component for displaying information, a plurality of switches, flash memory, and a receiver for scanning a frequency range to detect available radio frequencies on which no broadcast transmissions or interfering signals are currently received. The device further comprises a transmitter for transmitting audio data on an available frequency channel to the RDS radio receiver as a TA or TP and/or EON to be received by the RDS capable radio receiver. The transmitter transmits audio data on the detected available radio frequency and causes the RDS capable radio receiver to automatically switch to the detected available frequency channel and therein transmit the audio data received from the wireless device on the frequency channel switched to.

The figures and the accompanying description of the figures are provided for illustrative purposes and do not limit the scope of the claims in any way.

FIG. 1 illustrates a block diagram of a communication system model. A source (not shown) originates a data message 101, such as audio, video, or text. If in one embodiment the data is nonelectrical (e.g., a human voice, television picture, teletype message), it is converted by an input transducer 103 into an electrical waveform referred to as a baseband signal or message signal 105. A transmitter 107 then modifies the baseband signal 105 for efficient transmission of a transmitted signal 109. The transmitter 107 may comprise one or more of the following subsystems (not shown): a pre-emphasizer, a sampler, a quantizer, a coder, and a modulator. The transmitted signal 109 is then transmitted over a channel 111.

The channel 111 is a medium such as a wire, coaxial cable, a waveguide, an optical fiber, or a radio link through which the transmitter output is sent. The channel 111 acts partly as a filter to attenuate the signal and distorts its waveform. The signal attenuation increases with the length of the channel 111. The waveform is distorted because of different amounts of attenuation and phase shift caused by different frequency components of the signal. For example, a square pulse is rounded or fanned out during transmission, called linear distortion. The channel 111 may also cause nonlinear distortion through attenuation that varies with signal amplitude. Partial correction of the attenuation is achieved by a complementary equalizer at the receiver.

The receiver 115 reprocesses the signal received 113 from the channel 111 by undoing the signal modifications made at the transmitter 107 and the channel 111. The receiver output signal 117 is fed to the output transducer 119 which converts the electrical signal to its original form—the message 121. The receiver 115 may comprise one or more of the following subsystems (not shown): a demodulator, a decoder, a filter, and a deemphasizer.

The signal is distorted by the channel and contaminated along the path by noise 123. The Signal-to-Noise Ratio (SNR) is the ratio of signal power to noise power. Signal strength decreases resulting in a SNR decrease with distance from the transmitter. Therefore, as a person is driving outside of the range of a given transmission the signal power reduces and the effects of noise increase. This noise may result from strong co-channels interfering with the present station. Co-channels are broadcasted signals on the same station frequency that interfere with the current broadcast while driving out of its range and into another broadcast range. Strong neighboring channels may also cause noise interferences on the station. While not broadcasting on the same frequency station as the one currently set to, these neighboring channels may spill over into the current frequency station in the car because of their stronger signal.

The Radio Data System (RDS) is an extension of the standard FM radio transmission. It allows FM broadcasters to send more than just an analog audio signal over the air interface. Stations can transmit digital RDS data for reception by RDS equipped FM tuners. Detailed information about the function of RDS can be obtained from many sources.

A typical feature of RDS is the Alternative Frequency (AF) function. The AF of most RDS capable radios will automatically track an FM tuner to the strongest signal carrying the program a user was originally listening to when the original broadcast got too weak to be received properly. The way this function operates can be summarized using the example of an RDS capable FM receiver in a car stereo system. The original RDS broadcast contains a coded list of all the alternative frequencies carrying the same information that are used for broadcasting the same program. When the original broadcast fades below a certain threshold the RDS circuitry in the car radio will search the alternative frequencies for the strongest, most useable signal of the same broadcast and automatically switch to it without any action required by the listener.

The Travel Announcement and Traffic Program Identification Flag (TP) are other typical feature of RDS. These functions are used to identify stations that offer traffic programs. The flag is set on the broadcast and on the RDS car radio for recognition of those broadcasts on alternative frequencies by AF.

In one embodiment, the TP and TA flags can be used for automatic station searching either by themselves or in conjunction with another function in of RDS called the Enhanced Other Network (EON) function. The flags TP and TA have the following functions:

| TP | TA | Function |
|---|---|---|
| 0 | 0 | Program offers no traffic program |
| 0 | 1 | Traffic program is offered via an EON referenced program |
| 1 | 0 | Traffic program itself offers traffic program and eventually via EON |
| 1 | 1 | Ongoing traffic announcement on present program |

TP is used to indicate an ongoing traffic announcement. A tuner can use the TA as follows: auto-switch to FM tuner if another audio source is selected (CD, cassette etc.), automatic audio volume increase, auto-switch to prior audio source at the end of a traffic announcement. The Music/Speech switch is used to identify if music or speech program is transmitted. The signal supports tuner with two individual volume modes one for music, the other for speech. This enables the user to configure the settings according to individual requirements.

The Traffic Program (TP) or Travel Announcement (TA) function of the RDS receiver allows the detection of travel announcements broadcast by local radio stations. The RDS receiver scans when a predetermined threshold for determining signal strength by a SNR or volume level is reached by use of the AF function. The RDS receiver therein detects an available channel based on predetermined SNR levels or power levels. In addition, when the TP or TA bit is set to one on the RDS radio the AF function will detect only those channels broadcasting with the TP or TA flag set. The detected frequency channels meeting the specified criteria are then stored in a memory and switched to again upon detection of a weak or fading broadcast signal.

Figure 2A:
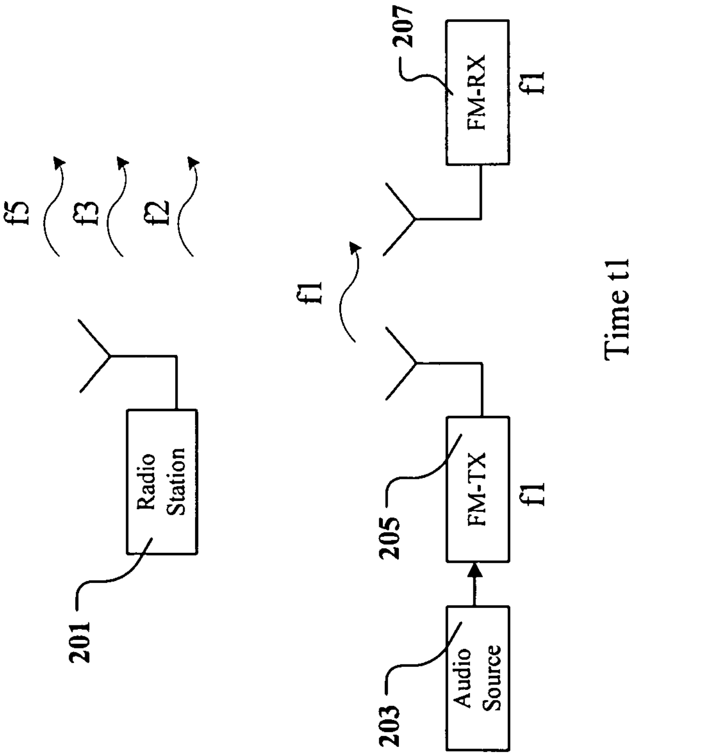
FIG. 2*a* is an illustration of changing conditions that result from strong co-channels and neighbor channels during transmission of a handheld audio device to a radio system during transit.
Figure 2B:
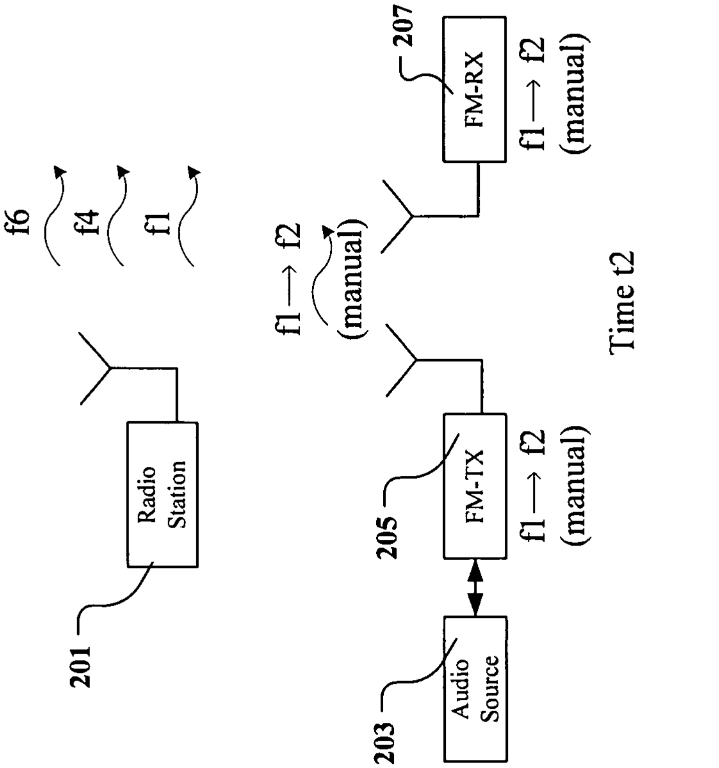
FIG. 2*b* is an illustration of changing conditions that result from strong co-channels and neighbor channels during transmission of a handheld audio device to a radio system during transit.

Referring now to FIGS. 2*a* and 2*b* , block diagrams illustrate changing conditions that result from strong co- and neighbor channels during transmission of a handheld audio device to a RDS radio system. For example, the RDS radio system may be a car stereo system receiving a transmission during a car journey. The changing conditions result from strong co-channels and/or neighbor channels becoming strong blockers to a transmission occurring over a cell phone, MP3 player, or some other audio transmitting device 205 transmitting to a radio receiver 207 of a car or some other loudspeaker system on frequency channel f1.

At FIG. 2*a* , one or more radio stations 201 in a geographic location at time t1 may transmit signals on several different frequency channels, such as f5, f3, and f2, respectively. As the geographic location changes amid transportation the SNR falls below a minimum level necessary for reliable communication, thereby causing a disruption of the transmission from the handheld audio transmitting device 205 to the FM receiver 207. The effect is a disruption in the signal communication being received by the receiver 207.

The disruption of audio transmission occurring on frequency channel f1, for example, is not only the result of distance, but may also be from strong blockers such as transmissions on neighboring channels. These will also cause a disturbance and a decrease in the SNR, therein making transmission of a particular audio data noisy on that particular frequency channel. At time t1 during transport the mobile phone transmitter 205 functions sufficiently well (e.g., SNR above a predetermined threshold) because of the absence of strong co-channels and/or neighboring channels interfering.

FIG. 2*b* illustrates the situation after proceeding along time and distance at time t. One or more radio stations 201 interferes with the frequency channel f1 because of co-channel interference or strong neighboring channels. This requires the user of the audio device to transmit the audio source 203 on another frequency channel (f2, for example) by manually switching the FM transmitter 205 to an available channel. The receiver 207 also must be reset manually in order to receive the transmission from the mobile phone or other audio device 203 transmitting audio data. It would be beneficial to be able to switch over to an available channel and switch the receiver to the new available channel in automatic, seamless fashion.

An embodiment of the present disclosure utilizes the TA and TP function flags of an RDS radio receiver to implement the switching mechanism of an RDS receiver when transmitting from a cell phone or other audio handheld device with wireless capability. The TP flag or TA flag of the RDS radio receiver allows for a switch to the transmitted frequency channel from the wireless cell phone device in order to transmit music or other audio data from the RDS radio receiver in a car or other transportation vehicle.

Figure 3A:
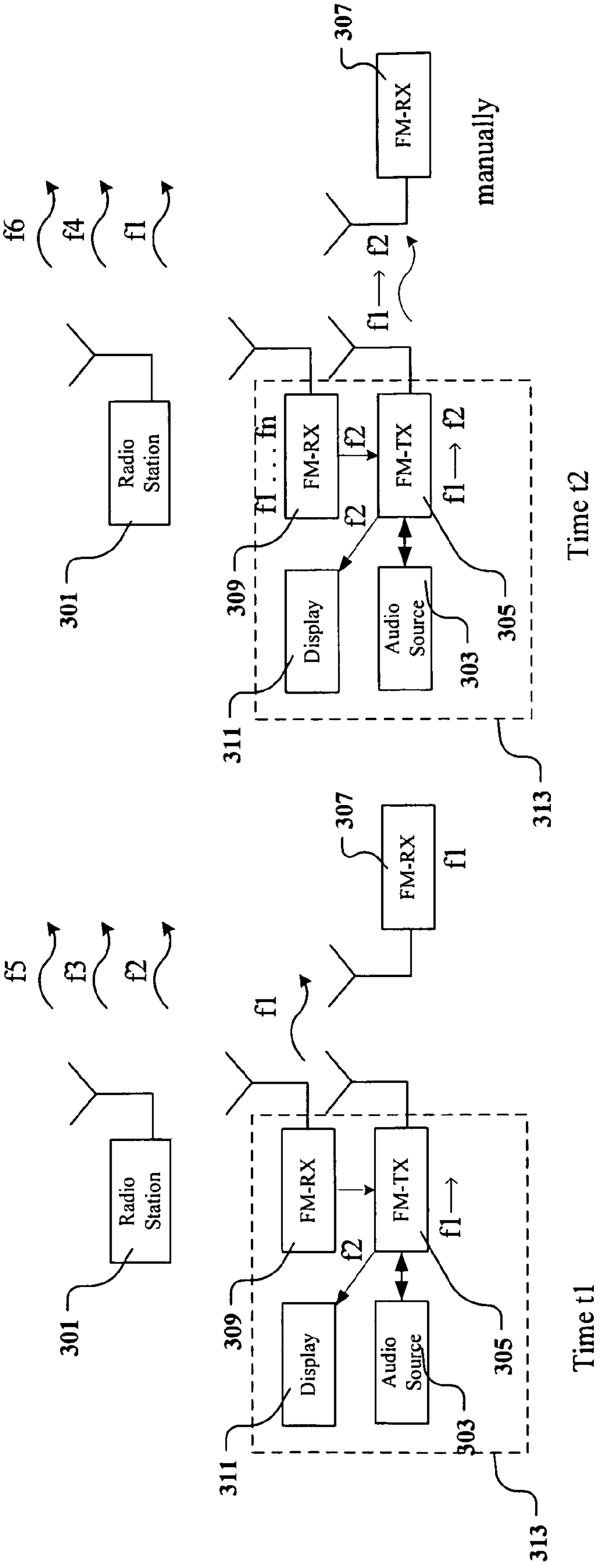
FIG. 3*a* is an illustration of an embodiment of the present disclosure for overcoming changing conditions to transmissions of an audio device to a radio system during transit.
Figure 3B:
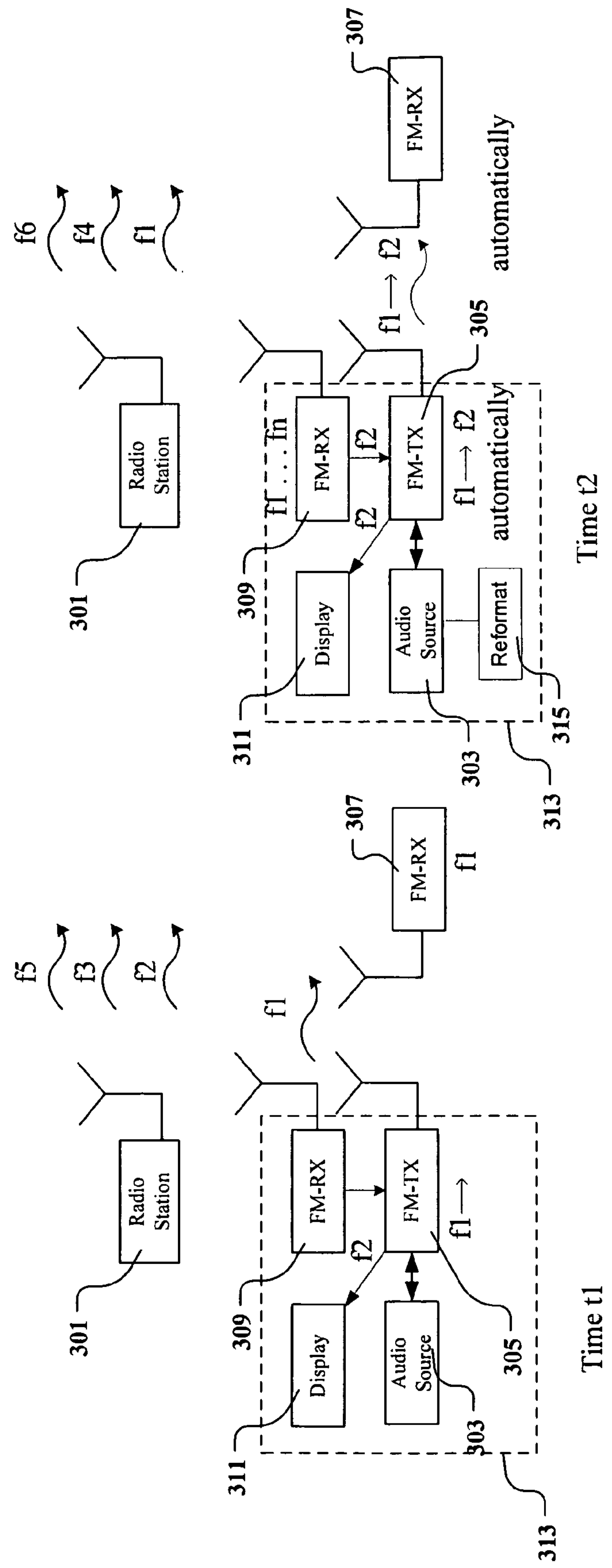
FIG. 3*b* is an illustration of an embodiment of the present disclosure for overcoming changing conditions to transmissions of an audio device to a radio system during transit.

Referring now to FIG. 3*a* and FIG. 3*b* , block diagrams illustrating diverse embodiments are provided. Both FIG. 3*a* and FIG. 3*b* illustrate an example of how to overcome the break up in frequency channel reception caused by strong co-channels or neighboring channels on a receiver. The vehicle in which a car radio system is installed will usually travel through areas with different reception conditions and as a result the frequency channel will need to be changed to an available channel that satisfies the minimum acceptable transmission conditions. FIGS. 3*a* and 3*b* illustrate two different ways in which the frequency channel can be tracked and changed in conjunction with an RDS capable radio receiver 307.

An audio or wireless device 313 is configured to track on the transmitter side and change the frequency if required and message for a frequency change. In one embodiment the frequency change is performed autonomously by directly and actively influencing the RDS radio set 307 by use of the TP or TA function. Alternatively, a manual display on the wireless device 313 could message for a manual change and frequency channel set by the user.

FIG. 3*a* illustrates of one embodiment of a method for radio transmission comprising frequency transmissions of a radio station 301 at time t1 and time t2 from a cell phone, MP3 player, PDA or some other audio device 313. After receiving an audio source 303, such as an MP3 file, the audio transmitting device 305 transmits the audio data to an RDS capable radio receiver 307. Therein the transmission from the wireless cell phone, for example, will allow the RDS receiver 307 of any given loudspeaker system to transmit the desired transmission of music on an appropriate frequency channel. One or more radio stations 301 in one geographic location may transmit signals on several different frequency channels, for example f5, f3, and f2. As the geographic location changes amid transportation the signal-to-noise ratio (SNR) falls below a minimum necessary for communication causing a disruption of transmission from the handheld audio transmitting device 305 to the FM receiver 307 of a car radio, for example. The effect is a disruption in the signal communication.

The audio device 313 further comprises a RDS receiver 309 that can therein utilize the Program Service Name function (PS), Program Type Code (PTY) function or Radio Text function (RT) of an RDS receiver by a reformat device 315. Most typical RDS receivers come with a Program Service Name function (PS), Program Type Code (PTY) function or Radio Text function (RT) of an RDS receiver. The PS function allows the name of the radio station, abbreviated to fit into eight characters, such as BBC R.4 for BBC Radio 4. This makes presetting stations easier, especially if the radio has push buttons. For example, one can set button 4 for BBC Radio 4 and RDS will automatically tune to the best frequency for Radio 4 when you press the button. The PTY function shows the type of program, e.g. sport, news, and classical music. Some radios allow you to select the type of program as well as the station. The RT function allows a radio station to transmit short messages, such as the program title or details of a music track being played. The present disclosure could implement these functions as well for display on the RDS radio integrated into a transportation vehicle such as a car, train or otherwise. The audio device display 311 can, therefore, display information such as the name of the station, the time and date, and short messages transmitted by the station by using these functions respectively.

In one embodiment, radio music may also be played over the cell phone in an advanced receiver-transmitter scheme utilized by the cellular or wireless audio device 313. As a vehicle travels into time t2 one or more radio stations 301, which may be another radio station or the same one as at t1 with alternative transmission sites, can interfere with the frequency channel f1 because of co-channel and/or neighboring interference. In one embodiment of the disclosure a display 311 is connected to the audio device 313. The display 311 is configured to display frequency channel information in one embodiment of the disclosure in order to inform the user of the wireless device that a frequency change is required to an available frequency channel of appropriate signal strength. In another embodiment, a special tone or signal may be provided to give the user an indication regarding the need to switch to an available frequency. Subsequently the user may manually adjust the receiver 307 to an available channel meeting a minimum threshold level in SNR based on indication from the transmitter display 311.

Referring now to FIG. 3*b* is another embodiment wherein the audio device 313 is configured to instigate an automatic frequency channel switch at the RDS receiver 307. The receiver 309 scans for an available frequency channel when interference occurs on the current frequency channel. This may also be programmed to occur at various intervals or be done continuously. After searching through the AF function any channels that are deemed available may be stored in a memory (not shown) and then selected from in order to continue transmission of the audio source 303. The transmitter 305 receives a detected frequency channel information f2 from the receiver 309 and therein switches to the detected frequency channel f2 to transmit audio data. The transmitter 305 transmits the audio data on the detected frequency channel f2 to the RDS radio receiver 307 as a Travel Announcement (TA) or Traffic Program (TP) to be received by the RDS capable radio receiver 307. This process is instigated by the detection of a low power signal or low SNR.

Just as the receiver 309 scans upon the detection of a low power signal or low SNR, the RDS receiver 307 of a car stereo, for example, also scans upon reaching a predetermined threshold level for signal quality. When the transmitter 305 transmits on a new frequency with the TA or TP flag, the RDS radio detects stations broadcasting with the same TA or TP flag when either of these flags is selected manually on the RDS car radio. These stations are also ones meeting the requisite signal quality. For example, frequency channel f2 in FIG. 3*b* is used for transmission of the audio source 303 data by the transmitter 305.

In one embodiment the Program Identification Code (PI) of the RDS system is evaluated to determine if a received signal on a scanned frequency belongs to a licensed broadcast. If a PI code is received belonging to a licensed broadcast it can be verified if the sender is associated with a licensed legal broadcast. If there are no available frequencies found at this point an error message can be outputted.

In one embodiment, the PI code may also be used to identify the specific signal of a given cell phone, wireless, or handheld audio device 313 in addition to the TP, TA, or EON bit being set on the transmitted signal. In this manner, the stored channels found by the AF function will not be confused with any other traffic programs or travel announcements not transmitted by the audio device 313. In another embodiment the audio transmission can be interrupted during the frequency change and at the same time send a flag signal to external components to stop or to interrupt CD, cassette, other audio streaming data, or text data from the RDS capable radio receiver 307.

The Traffic Program (TP) or Travel Announcement (TA) function of the RDS receiver allows the detection of travel announcements broadcast by local radio stations. The handheld device or audio device 313 scans when a predetermined threshold for determining signal strength by a SNR or volume level is reached. The receiver 09 of the audio device 313 scans to detect an available channel based on chosen SNR levels or power level. The detected frequency channels meeting the specified SNR level and/or volume level for low interference are then stored in a memory (not shown). This scanning can be programmed to be at certain intervals, continuously in the background, or at only specified levels below a certain predetermined threshold. The transmitter 305 then switches to a detected frequency channel stored in memory for transmission upon detection of a low SNR or power level. In addition, the receiver 307 scans for an alternative frequency with the TP or TA flag on and upon a low SNR level or volume level of the currently received transmission. This occurs if the TP or TA flag is set on the receiver 307. This occurs in conjunction with the AF function which stores the frequency channels broadcasting with the TP or TA flag bit on. In another embodiment those channels are stored and upon a low SNR or power level threshold the switch to the new channel occurs. Whether one is listening to a radio station, CD or cassette, RDS will alert you to the travel announcement by raising the volume and/or switching to the local radio station upon which the audio device 313 is transmitting by its transmitter 305 automatically. Likewise the same flag bit that is set by the user on the RDS radio 307 can be used to switch frequency channels autonomously (i.e., not manually) switches to the desired transmission channel of an audio device 313 that contains the same flag data for audio transmission. This would provide hands free driving so that the user does not have to take their hands off the steering wheel of a car, for example.

In one embodiment, the receiver 309 scans either the frequency range or a predetermined band around the current frequency in predetermined increments such as 200 KHZ or 100 KHz, for example. This scanning may be programmed to increment in increasing fashion in predetermined increments; alternatively or additionally, the receiver 309 could be programmed to decrement in decreasing fashion relative to the current frequency channel in predetermined decrements.

The scanning performed by the receiver 309 may be performed continuously or in regular time intervals to save power in one example. The receiver 309 scans the frequency range for a low or substantially undisturbed frequency band according to a predetermined threshold, such as an SNR. In another embodiment scanning may be initiated at the detection of a low volume signal or low power signal that indicates co-channel or neighboring channel interference. At the detection of an available frequency channel the receiver therein is configured with the transmitter 305, which can for example be an FM transmitter or analog modulating transmitter.

The RDS traffic information service allows listeners to receive traffic reports if listening to an MP3 , or other transmitted data from the audio device 313, or with the receiver volume turned down or muted. This can make use of two flags: the TP and TA flags. If the TP flag is set to one, this indicates that the tuned program service provides the RDS traffic service. The TA flag is also set to one for its use. Program services that do not provide traffic services with a switched TA flag, but instead cross-reference via EON services that do, indicate this by setting the TP to zero and the TA flag to one on the service. The audio device 313 likewise may do the same as an alternative embodiment of the disclosure. When a listener selects the RDS traffic service feature on their RDS capable radio, the receiver 307 may also use the status of both the TP and the TA flags to determine whether or not the tuned service can provide the traffic information service itself, or alternatively in the case of an EON capable receiver, via a cross-referenced service.

The TP flag can be used by an RDS receiver to evaluate the availability of the RDS traffic service when checking a frequency as part of the automatic tuning capability. If the alternative frequencies stored by the AF function do not have the RDS traffic program information, as marked by the TP flag bit, an RDS receiver can indicate this to the listener by the display 309 coupled to it. The TA flag is used to stop the tape, cassette, CD playing in the radio and raise the volume during a traffic bulletin.

Alternatively, in another embodiment the cell phone or handheld wireless audio transmitting device 313 of FIG. 3*a* and FIG. 3*b* can implement the Enhanced Other Networks (EON) function of an RDS capable radio system. This also allows the receiver the capability to monitor other stations for traffic broadcast. Program services that do not provide traffic services with a switched TA flag, but instead cross-reference via EON services that do, indicate this by setting the TP to zero and the TA flag to one on the service. When a listener selects the RDS traffic service feature on their RDS capable radio, the receiver uses the status of both the TP and the TA flags to determine whether or not the tuned service can provide the traffic information service itself, or alternatively in the case of an EON capable receiver, via a cross-referenced service.

Figure 4:
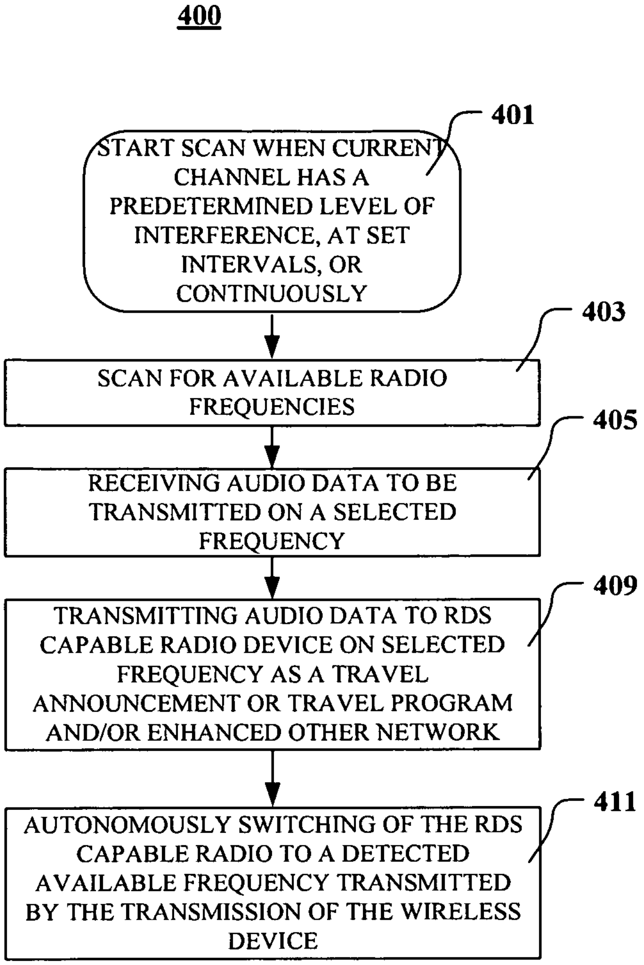
FIG. 4. is a flowchart of a method in accordance with one embodiment of the present disclosure.

Referring now to FIG. 4 is a method 400 that shows the steps of an example embodiment beginning at 401. The method begins at the determination of channel interference in one embodiment. Alternatively, the method can begin at 401 without channel interference by programming the receiver to scan continuously or at regular intervals in the background. At 403 the respective frequency range (e.g. 88-108 MHz for FM radio) is scanned to detect available frequencies. Scanning may be initiated by channel interference reaching a predetermined threshold determining a low SNR or power level. Alternatively, scanning may be performed continuously in order to detect alternative available frequency channels and update those available in a memory for storage thereof.

In addition, scanning can be programmed for occurring at any given interval. The term "available" is meant to be those frequencies not used by licensed broadcast, such as a radio station program, which is not to be interfered with according to FCC, as well as those channels that meet a predetermined threshold of interference indicating a relatively quiet or clear channel.

In one embodiment, the PI of the RDS system is evaluated to determine if a received signal on a scanned frequency belongs to a licensed broadcast. If a PI code is received belonging to a licensed broadcast it can be verified if the sender is associated with a licensed legal broadcast. If there are no available frequencies found at this point an error message can be outputted on the display to inform the user.

The selection may be based on various parameters, depending on the particular situation. For example, if—in an earlier connection between the audio player and the FM radio receiver—the user has already stored a specific frequency as a preset in his car radio or like, it would be advantageous to re-use this frequency for convenience. Thus, if this frequency is still available one possible selection criterion could be to favor the last used frequency.

In an one embodiment, it could be possible to store the detected available frequencies together with an indicator of the channel quality, e.g. how strong background signals are on this frequency, and then preferably choose the one with the highest expected quality.

At 405 the audio data is received which is to be transmitted on a selected frequency channel. This includes receiving the audio data through an external interface from an external audio player device such as an MP3 player, e.g. through a conventional cable connection or a suitable wireless link. This belongs to the case in which the transmission device is a separate device or module which is connectable to an audio player device. However it is also possible to have a player device with a corresponding built-in transmission module, and in this case the audio data will be received through an internal interface located inside the player device. Also the method comprises receiving the audio data in various common formats, both digital and analog, and also in compressed formats like MP3 or the like as well as uncompressed audio data.

At 409 the FM-modulated audio data are transmitted to the RDS capable FM radio receiver as a travel announcement or traffic program, using the frequency that was selected. At 411 the transmission from the audio device transmitter allows for an autonomous switching of the RDS radio to the frequency detected by the receiver of the wireless device. The major advantage lies in the fact that any RDS capable FM radio receiver can be used to play back the audio transmitted from the handheld audio device without much interruption by the user.

Alternatively and/or additionally, the other information can be transmitted via EON. EON in conjunction with PI will identify any other station being broadcasted on the channel and assigns the related properties in which to detect. EON in conjunction with the TP Flag of the program can be transmitted by the handheld audio device. As one embodiment of the disclosure this makes it possible to identify if the other station is a station that is broadcasting or would broadcast a traffic program audio data from the audio or mobile wireless device and therein switch when the signal of the audio wireless device is broadcasting with this.

In one embodiment the EON function in conjunction with the TA flag can be transmitted via EON which makes it possible to detect an ongoing traffic announcement on other stations and therein also detect if transmission from a nearby audio device is broadcasting information as well on other stations. The flag can be used to automatically switch to the other program during the transmission of the audio music on another frequency. In this manner, the TA flag may be used for a program switch for a frequency being transmitted on by a wireless phone.

The basic operation method just described already provides the advantage that the user is not forced to search for suitable available frequencies in a manual way. This can be troublesome and inconvenient. This step can be performed automatically when first initiating the audio transmission, and a free frequency will then be found faster and in a far more comfortable way for the user. In principle until now the FM radio receiver could be of a simple type. However the same features of the present disclosure make use of the enhanced capabilities provided by an FM radio receiver being capable to handle the Radio Data System (RDS).

Figure 5:
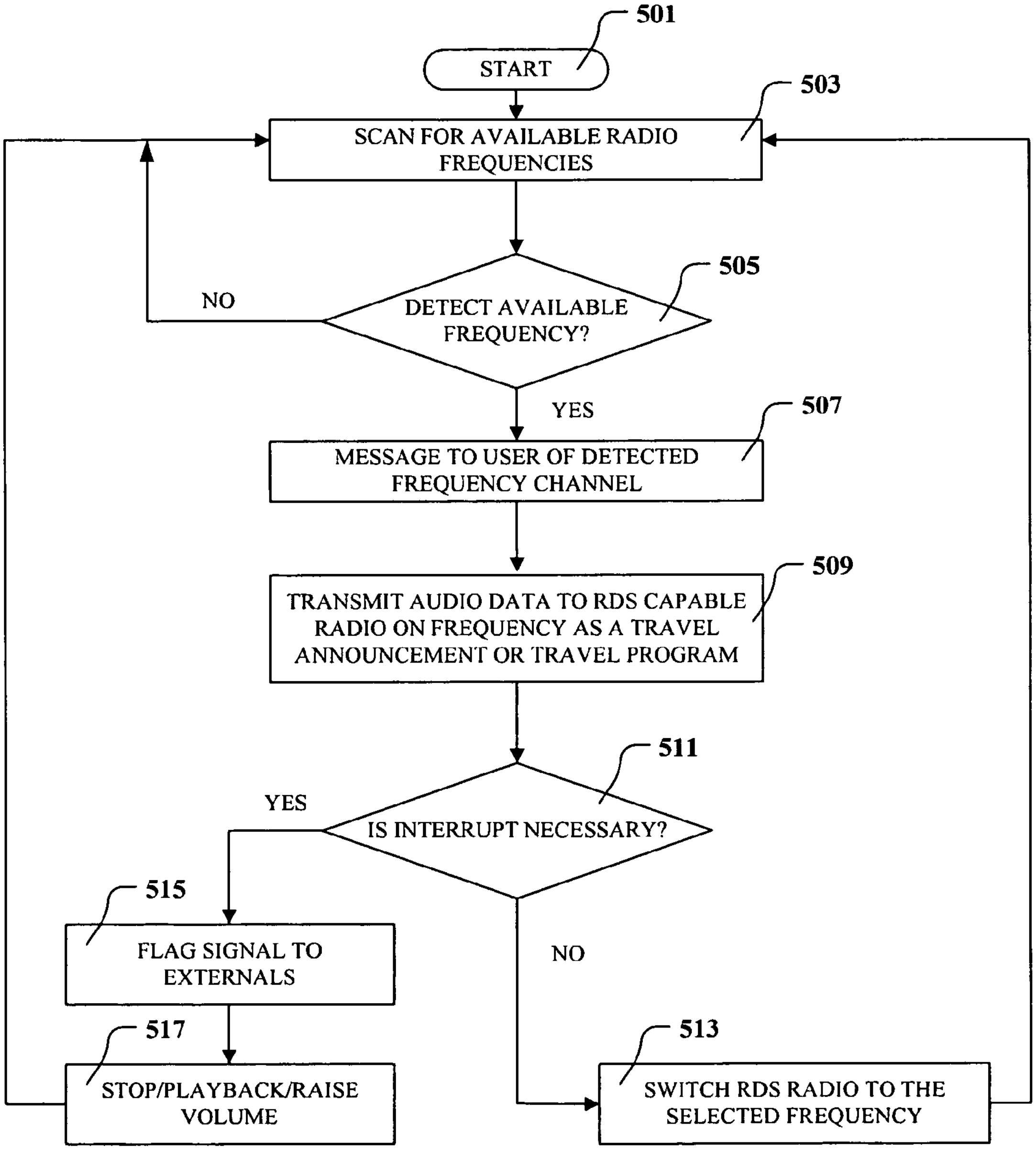
FIG. 5 is a flowchart of a method in accordance with one embodiment of the present disclosure.

FIG. 5 shows further possible steps of a method for transmission of radio data. The steps shown here may continue the basic steps described in conjunction with FIG. 3*b*. The transmission of the modulated audio data is performed at 709. At least one frequency as a TP or TA is transmitted as well at 509. TP may be utilized in conjunction with the TA flag where the user has first selected the TP feature on the RDS radio. The Traffic Program Identification Flag is used to identify stations that offer traffic program. The flag is set if the station automatically sets the TA flag on traffic announcements. The TP can be used for automatic station searching. The Traffic Program Identification Flag is transmitted in every group.

Alternatively, the other information can be transmitted via EON. EON in conjunction with PI will identify any other station being broadcasted on the channel and assigns the related properties in which to detect. EON in conjunction with the TP Flag of the program can be transmitted via the wireless device. As one embodiment of the disclosure this makes it possible to identify if the other station is a station that is broadcasting or would broadcast a traffic program audio data from the audio or mobile wireless device and therein switch when the signal of the audio wireless device is broadcasting with this. In another embodiment the EON function in conjunction with the TA flag can be transmitted via EON which makes it possible to detect an ongoing traffic announcement on other stations and therein also detect if transmission from a nearby audio device is broadcasting information as well on other stations. The flag can be used to automatically switch to the other program during the transmission of the audio music on another frequency. In this manner, the TA flag may be used for a program switch for a frequency being transmitted on by a wireless phone.

In regular intervals it is detected, at step 505 if there is a pause or a low volume passage in the audio. The detection could also be configured for any detection of a low power signal indicating poor channel reception and/or strong blockers of the entering region. If there is no such pause or low volume passage transmission is continued and the detection is repeated. If a pause or like is found in the audio it is checked and if the presently used frequency is still available, i.e. not used by another transmitter.

At 507 the user is messaged a signal or text on a display of the device that a new clearer or unavailable frequency channel has been detected to transmit over. The user may the manually instigate the transmission to then autonomously trigger a frequency channel switch at 513 on the given RDS capable radio or can switch without any confirmation as an automatic function. If an interrupt at 511 occurs by choice of the user and other devices need to be halted, a flag may signal external devices to cease play at 515. Then, at 517 the user may instigate a stop/ playback of the audio transmission from the audio device and/or raise the volume. Afterwards, scanning resumes in the background without interference at 503. The FM radio receiver will follow according to the TA, TP and/or EON function and tune to that frequency such that the audio playback can continue.

Figure 6:
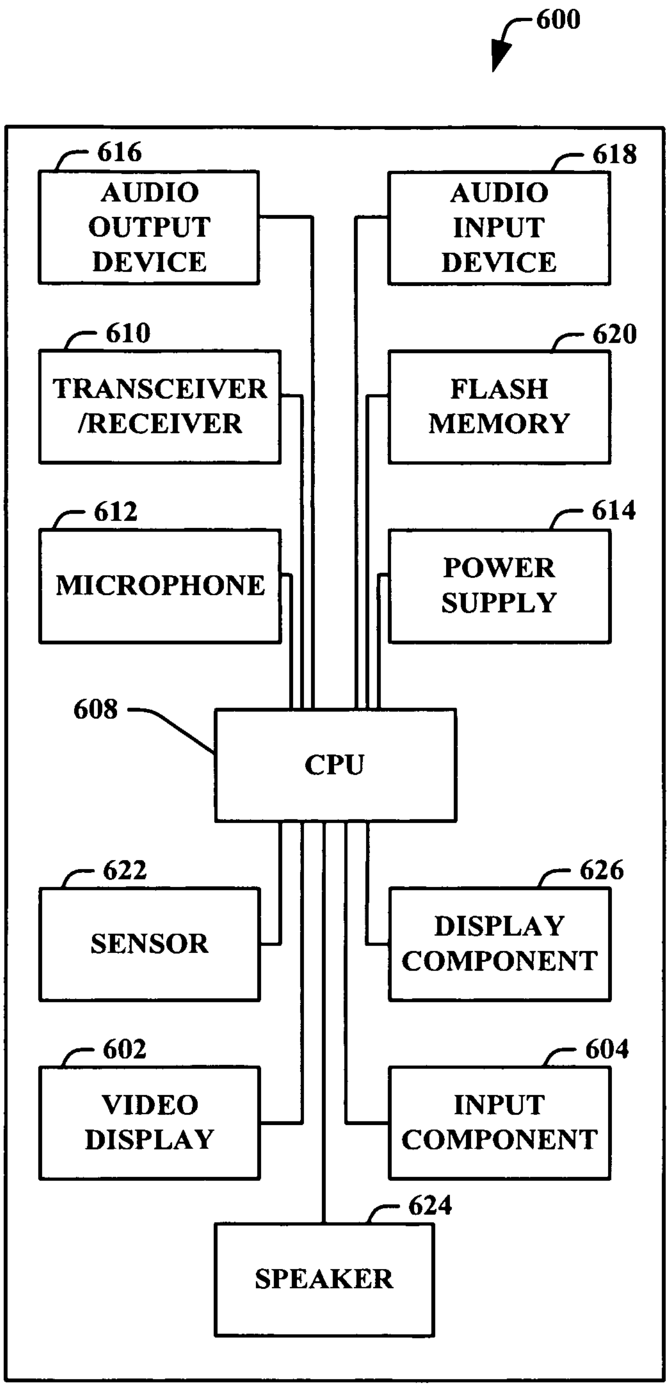
FIG. 6 is an isometric view of a device and block diagram according to yet one or more aspects of the present disclosure.

FIG. 6 is an exemplary portable electronic device, for example, a Personal Data Assistant (PDA) 600 comprising a video display 602, an input component 604, a CPU 608, a transceiver and a receiver 610, a microphone 612, a power supply 614, an audio output device 616, an audio input 618, flash memory 620, various sensors 622, and speaker(s) 624. The flash memory 620 utilizes dual bit and single bit memory devices. Transceiver and receiver 610 are capable of scanning for an undisturbed and available frequency channel by which the transmitter may transmit audio data on to an RDS capable radio. The transceiver transmits on the detected frequency as a travel announcement or traffic program. The audio input device 618 can be a transducer, for example. The input component 604 can include a keypad, buttons, dials, pressure keys, and the like. The video display 602 can be a liquid crystal display, a plasma display, an LED display, and the like, for displaying visual data and information. In accordance with another embodiment of the claimed subject matter, the portable device with flash memory 620 manufactured according to the present disclosure, comprises cell phones, memory sticks, flash drive devices, video camcorders, voice recorders, USB flash drives, fax machines, flash memory laptops, MP3 players, digital cameras, home video game consoles, hard drives, memory cards (used as solid-state disks in laptops), and the like. The flash memory 620 can include random access memory, read only memory, optical memory, audio memory, magnetic memory, and the like.

Although the disclosure has been shown and described with respect to a certain aspect or various aspects, equivalent alterations and modifications will occur to others skilled in the art upon the reading and understanding of this specification and the annexed drawings. In particular regard to the various functions performed by the above described signals (assemblies, devices, circuits, etc.), the terms (including a reference to a "means") used to describe such signals are intended to correspond, unless otherwise indicated, to any signal which performs the specified function of the described signal (i.e., that is functionally equivalent), even though not structurally equivalent to the disclosed structure which performs the function in the herein illustrated exemplary embodiments of the disclosure. In addition, while a particular feature of the disclosure may have been disclosed with respect to only one of several aspects, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising."

What is claimed is:

1. A method for a transmission of data from a mobile device to a first radio data system (RDS) capable radio receiver, comprising:

obtaining a list of available frequencies by a second RDS capable receiver of the mobile device using an alternative frequency function;

scanning the list of available frequencies to detect an available frequency channel that meets a predetermined criteria of availability by the second RDS capable receiver of the mobile device;

in response to detecting an available frequency channel that meets a predetermined criteria of availability by the second RDS receiver of the mobile device, setting a Travel Announcement indicator or a Traffic Program indicator in the detected frequency channel as a flag; and transmitting data on the detected frequency channel that comprises the Travel Announcement indicator or the Traffic Program indicator from the mobile device to the first RDS capable radio receiver, wherein the first RDS capable receiver includes an RDS decoder.

2. The method of claim 1, wherein transmitting data on the detected frequency channel from the mobile device enables the first RDS capable radio receiver to switch to the detected frequency channel.

3. The method of claim 1, wherein the predetermined criteria of availability of a channel is a predetermined signal to noise ratio threshold and/or a volume level.

4. The method of claim 1, wherein scanning is repeated at regular time intervals or continuously.

5. The method of claim 1, further comprising repeating scanning of the frequency range when a low power signal is detected on the detected frequency channel.

6. The method of claim 1, further comprising increasing a volume of the first RDS capable radio receiver automatically.

7. The method of claim 1, further comprising:

reformatting information received from the mobile device to be used by a Program Service Name function, Program Type Code function and/or Radio Text function of the first RDS capable radio receiver; and transmitting reformatted information to the first RDS capable radio receiver and to a display device.

8. The method of claim 1, wherein the obtaining the list of available frequencies includes using an RDS Program Identification Code for detecting if a frequency is being used for licensed broadcast transmission.

9. The method of claim 1, further comprising setting a second flag by the second RDS capable receiver to indicate availability of an information service.

10. A device for radio transmission of data for being received by a first radio data system (RDS) capable radio receiver, comprising:

a second RDS capable receiver configured to obtain a list of available frequencies, scan the list of available frequencies to detect an available frequency based on a predetermined criteria of availability, and to set a Travel Announcement indicator or a Traffic Program indicator in the detected available frequency as a flag in response to the detected frequency;

a transmitter configured to transmit data on the detected frequency that comprises the Travel Announcement (TA) indicator or the Traffic Program indicator; and wherein the first RDS capable radio receiver includes an RDS decoder.

11. The device of claim 10, wherein the second RDS capable receiver and the transmitter are integrated into one transceiver unit that transmits to the first RDS capable radio receiver when a Travel Announcement flag or Traffic Program flag is turned on.

12. The device of claim 10, wherein the second RDS capable receiver is scanning for the available frequency upon detecting a low power signal.

13. The device of claim 10, wherein the second RDS capable receiver is configured to use an RDS Program Identification Code for detecting if a frequency is being used for licensed broadcast transmissions.

14. The device of claim 10, wherein the second RDS capable receiver is scanning for the available frequency based on signals of a predetermined threshold level upon detecting a volume level or a signal to noise ratio threshold has been reached.

15. The device of claim 10, wherein the transmitter transmits a message to a user via a display or special tone that the user should manually change the receiver and to what frequency channel.

16. The device of claim 10, wherein the device further comprises a reformatting component for reformatting information from the device to be used by a Program Service Name function, Program Type Code function or Radio Text function of the first RDS capable radio receiver and for transmitting a reformatted information to a display device via the first RDS capable radio receiver.

17. The device of claim 10, wherein the transmitter transmits information that causes an interruption in any CD, cassette, other audio streaming data, or text from the first RDS capable radio receiver while concurrently allowing calls to be received.

18. The device of claim 10, wherein the first RDS capable receiver is scanning at regular intervals or continuously when a low power signal is detected.

19. The device of claim 10, wherein the transmitter transmits information causing a volume of the first RDS capable radio receiver to increase autonomously.

20. The device of claim 10, wherein the transmitter transmits data on the available frequency and causes the first RDS capable radio receiver to automatically switch to the detected frequency and therein transmit the data received from the device on a detected frequency channel switched to.

* * * * *